United States Patent [19]
Kerr

[11] Patent Number: 4,535,883
[45] Date of Patent: Aug. 20, 1985

[54] SHOCK MOUNT TELESCOPING CONVEYOR BELT CLEANER

[75] Inventor: James F. Kerr, Croswell, Mich.

[73] Assignee: Material Control, Inc., Croswell, Mich.

[21] Appl. No.: 573,445

[22] Filed: Jan. 24, 1984

Related U.S. Application Data

[63] Continuation-in-part of Ser. No. 473,474, Mar. 9, 1983, abandoned.

[51] Int. Cl.³ .............................................. B65G 45/00
[52] U.S. Cl. .................................... 198/499; 15/256.5
[58] Field of Search .............................. 198/497–499; 15/256.5

[56] References Cited

U.S. PATENT DOCUMENTS

| | | | |
|---|---|---|---|
| 1,543,411 | 6/1925 | Wittig | 198/495 |
| 1,719,094 | 7/1929 | Vickery | 15/256.51 |
| 1,792,501 | 2/1931 | Maniere | 198/499 |
| 1,880,002 | 9/1932 | White | 198/624 |
| 1,975,591 | 10/1934 | Sinden | 198/499 |
| 2,168,622 | 8/1939 | Levin | 198/842 |
| 2,255,314 | 9/1941 | Graham | 384/546 |
| 2,551,123 | 5/1951 | Heller | 198/230 |
| 2,723,999 | 11/1955 | Scott | 92/74 |
| 2,794,540 | 6/1957 | Sinden | 198/230 |
| 2,850,146 | 9/1958 | Madeira | 198/109 |
| 3,088,156 | 5/1963 | Ljungquist et al. | 15/256.53 |
| 3,315,794 | 4/1967 | Ellington | 198/230 |
| 3,342,312 | 9/1967 | Reiter | 198/230 |
| 3,504,786 | 1/1968 | Matson | 198/230 |
| 3,598,231 | 8/1971 | Matson | 198/230 |
| 3,631,968 | 1/1972 | Ward | 198/230 |
| 3,656,610 | 4/1972 | McWilliams | 198/230 |
| 3,688,336 | 9/1972 | Costello, Jr. et al. | 15/256.51 |
| 3,722,667 | 3/1973 | Olson | 198/230 |
| 3,740,789 | 6/1973 | Ticknor | 15/256.53 |
| 3,750,228 | 8/1973 | Wake | 15/256.53 |
| 3,986,227 | 10/1976 | Fathergill et al. | 15/256.53 |
| 3,994,384 | 11/1976 | Reiter | 198/497 |
| 3,994,388 | 11/1976 | Reiter | 198/499 |
| 4,019,217 | 7/1977 | Schinke | 15/256.53 |
| 4,036,351 | 7/1977 | Reiter | 198/499 |
| 4,036,354 | 7/1977 | Reiter | 198/499 |
| 4,042,364 | 8/1977 | King et al. | 65/168 |
| 4,098,394 | 7/1978 | Stahura | 198/499 |
| 4,344,525 | 8/1982 | Bancroft | 198/499 |

FOREIGN PATENT DOCUMENTS

| | | |
|---|---|---|
| 910834 | 9/1972 | Canada . |
| 960990 | 1/1975 | Canada . |
| 862003 | 2/1941 | France . |
| 572062 | 9/1945 | United Kingdom . |

OTHER PUBLICATIONS

Martin Engineering Company Brochure, Form No. 2005, entitled "Vibratory Torsion Arm Belt Cleaner", 4 pages, (Copyright 1967).

Stephens-Adamson Mfg. Co., Bulletin No. 1854, (3M-S-6-60), entitled "S-A Spring Type Conveyor Belt".

(List continued on next page.)

Primary Examiner—Joseph E. Valenza
Assistant Examiner—Lyle Kim
Attorney, Agent, or Firm—Cullen, Sloman, Cantor, Grauer, Scott & Rutherford

[57] ABSTRACT

A conveyor belt cleaner having at least one blade mounted on a blade carrying member for scraping an endless conveyor belt. The blade carrying member substantially encloses and is telescopically received on a vertically adjustable elongate support member. A plurality of rollers are located between the blade carrying member and support member for rolling the blade carrying member on and off the support member to service the conveyor belt cleaner. An adjustment mechanism is provided for shifting the support member to change the amount of pressure with which the blade engages the endless belt. The tubular support may be segmented to facilitate removal in confined areas and to permit repair or replacement of individual segments.

14 Claims, 9 Drawing Figures

OTHER PUBLICATIONS

Martin Conveyor Products, Installation and Service Manual, Form No. 2894-1/80, entitled "Martin Trac-Mount Belt Cleaner", 74 pages.

Martin Conveyor Products Brochure, entitled "Martin Trac-Mount Systems", 8 pages, (Copyright 1979).

Vibrolator Mfg. Co. Blueprint, Entitled "Belt Cleaner Spring Arm", Drawing No. A-15189, Dec. 6, 1967.

Martin Engineering Co. brochure, entitled "Vibratory Torsion Arm Belt Cleaner", Form No. 1289-1068, 2 pages.

Stephens-Adamson Mfg. Co. Catalog, entitled "Stephens-Adamson Catalog 6.6", cover page and pp. 65-66, Copyright 1954.

Martin Engineering Co. brochure, entitled "Mounting Instructions Heavy Duty PM Model Belt Cleaners", Form No. 2620-1173, 1 page.

Conveyor Components Co. Catalog, entitled "Conveyor Components", Catalog No. C-216, 32 pages (Copyright 1970, 1975, 1977).

Conveyor Components Co. Catalog, entitled "Conveyor Components", Catalog No. C-218, 32 pages (Copyright 1970, 1975, 1977, 1980, 1981).

Conveyor Components Co. brochure, entitled "Model FA", pp. 6 and 7.

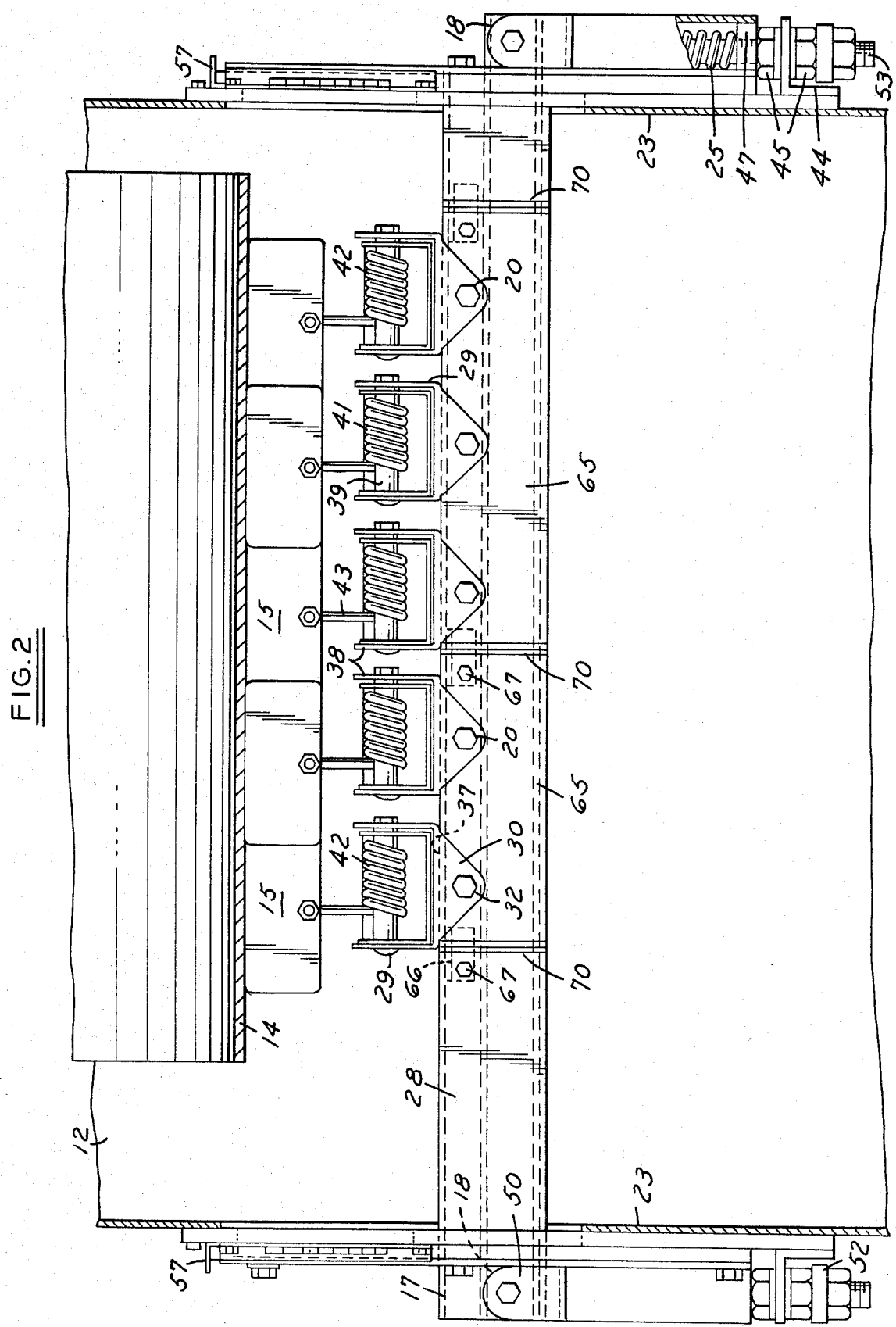

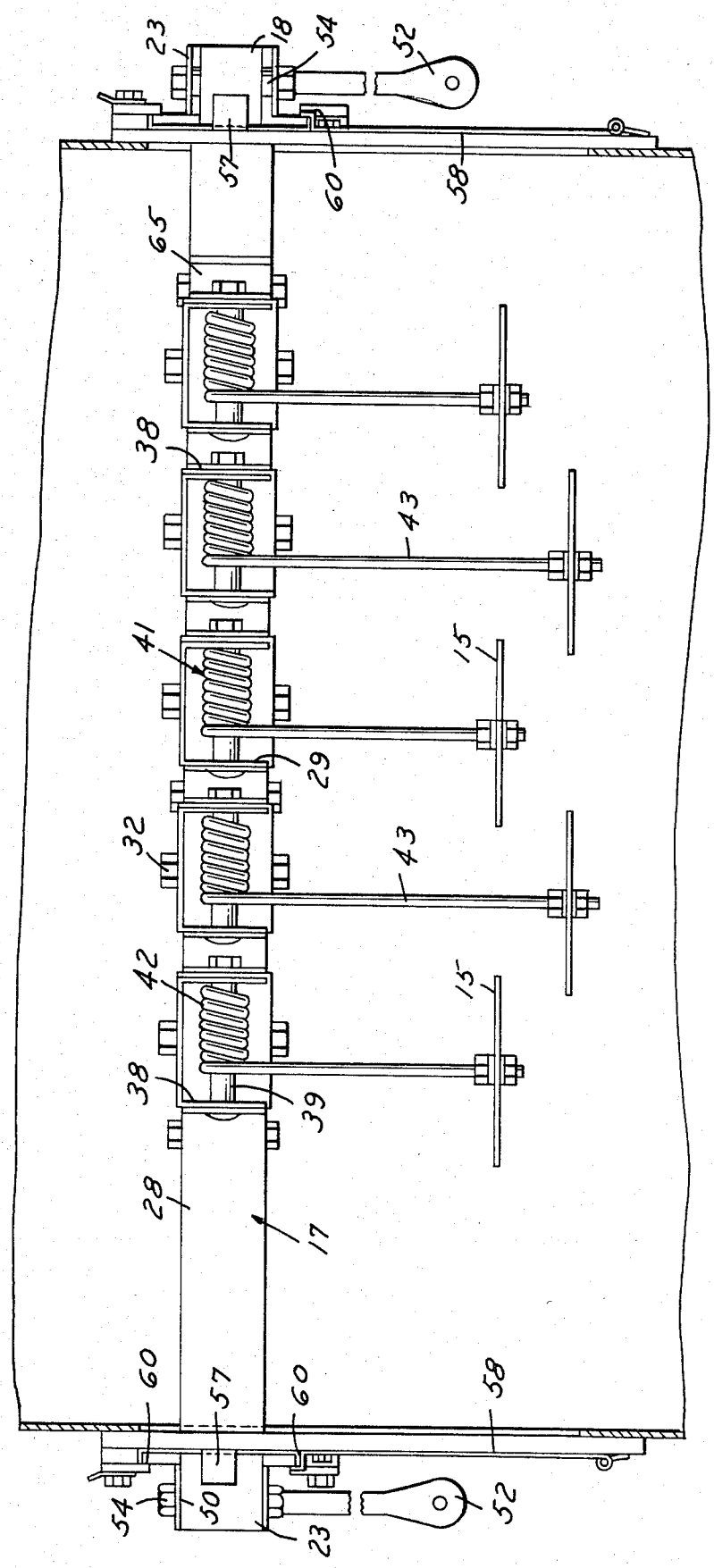

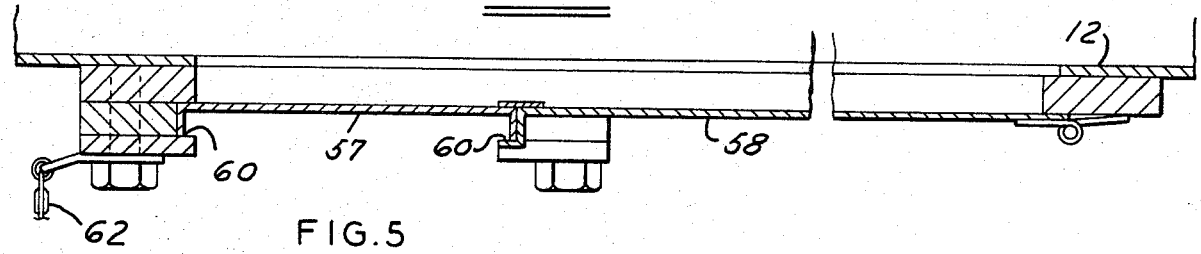
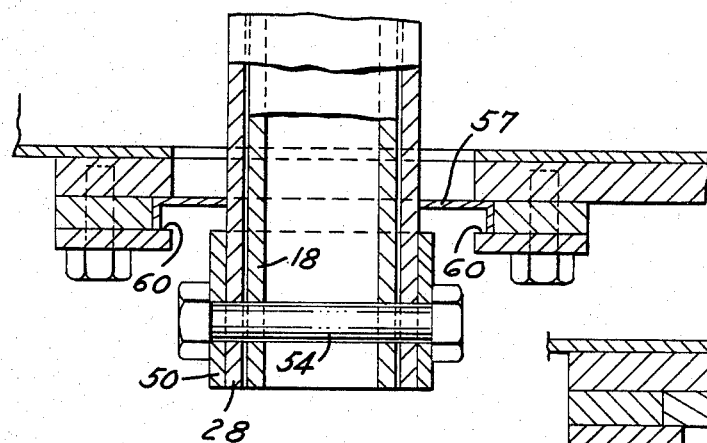
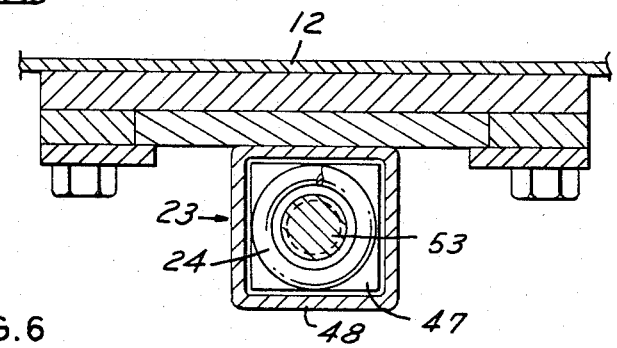
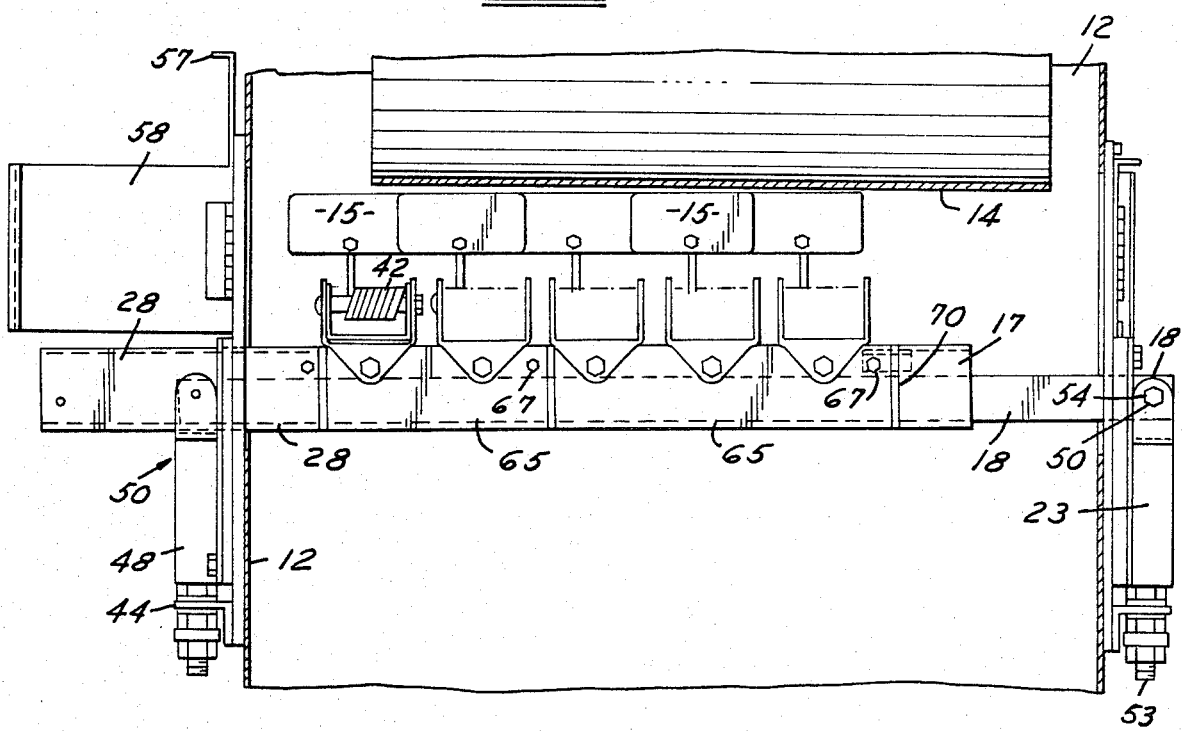

SHOCK MOUNT TELESCOPING CONVEYOR BELT CLEANER

CROSS REFERENCE TO RELATED APPLICATION

This application is a continuation in part of my application Ser. No. 473,474, Mar. 9, 1983 now abandoned.

TECHNICAL FIELD

The present invention relates to conveyor belt cleaners having blades for removing debris from the surface of a conveyor belt. More specifically, the invention relates to a conveyor belt cleaner which is attached to the conveyor by means of an adjustable spring mount.

BACKGROUND OF THE INVENTION

Conveyor belt cleaners are used on conveyors for continuously cleaning the surface of a moving conveyor belt by scraping debris from the lower run of the conveyor belt.

Conveyor belt cleaners should be rugged in construction and unaffected by debris falling from the surface of the conveyor belt. Conveyor belt cleaners are typically mounted beneath the lower run of the conveyor belt where debris removed from the surface of the belt may be deposited thereon. Accumulations of debris on moveable parts and surfaces over which parts move may inhibit movement and cause accelerated wear of the surfaces and parts.

Service is periodically required on the blades and blade support apparatus of conveyor belt cleaners. The blades are subject to wear over time and require adjustment to compensate for the wear. Eventually the blades and blade support apparatus must be replaced. In some applications, service is required on a daily basis to keep the conveyor belt cleaner functioning properly. As the frequency of service increases, the ease of servicing the cleaner becomes more important.

The conveyor belt cleaner may be safely serviced by either stopping the conveyor belt to work on the scraper blades and support structure while underneath the conveyor, or by moving the scraper blades and their support members from under the conveyor. If the conveyor belt cleaner is serviced in its operative position, under the conveyor, the conveyor belt should be stopped prior to servicing. However, if the scraper blades and support structure are removed from the conveyor, the servicing operations may be performed while the conveyor continues to operate.

One way of making a conveyor belt cleaner that is serviceable while the conveyor belt is operating is disclosed in U.S. Pat. No. 4,249,650 to Stahura. In the Stahura patent individual belt scraper blades are affixed to concentric sleeve members which slide linearly upon a support member arranged transverse to the direction of conveyor belt travel. The individual belt scraper blades are interconnected by links and all of the blades are moved along the support member by means of a cable. While the scraper blades of this apparatus may be serviced from the side of the conveyor belt, dirt and debris may accumulate on the support member between the sleeve members, making it difficult to move the sleeve members along the support member. This is particularly true when several sleeve members ae linked together to provide a long scraper blade because the total sliding friction between the respective members increases with length.

If the Stahura device is used, dirt deposited between the sleeve and support member may abrade the surface of the support member or sleeve. Such abrasion causes accelerated wear on the members which loosens the fit of the sleeve on the support member. These problems are particularly apparent when the cleaner is used to remove abrasive substances from the surface of the conveyor belt.

Another disadvantage of such a device is that the cable used to move the sleeve members and blades along the support member can become entangled in trailers, or torn portions of the belt, resulting in damage to the belt or belt cleaner.

When prior art conveyor belt cleaners are rigidly attached to conveyors having a mechanical splice they are subjected to repeated jolting blow or impacts each time the splice passes by the blades of the conveyor belt cleaner. While it is known to use resiliently mounted arms, as shown in U.S. Pat. No. 3,656,610 to McWilliams, repeated impacts can reduce the life of the spring arms. In addition, individual spring arms will have differing amounts of resiliency.

These and other problems encountered by prior art conveyor belt cleaners are overcome by the present invention.

SUMMARY OF THE INVENTION

The present invention relates to a resiliently mounted conveyor belt cleaner having scraper blades that are mounted on a blade carrying member to be rolled onto and off of a support member. The support member and blade carrying members are both supported on opposite sides of the conveyor by means of a resilient and adjustable mounting means. The versatile blade carrying member of the present invention is adapted for use with doctor blade conveyor belt scrapers, spring arm mounted conveyor belt scrapers, or other types of belt cleaning devices.

According to the present invention, a conveyor belt cleaner for an endless belt conveyor is provided in which the blade carrying member and support member have rotatable means interposed therebetween to permit the blade carrying member to be rolled along the support member. The mounting means for supporting the blade carrying member and support member does not interfere with or complicate rolling the blade carrying member along the support member.

The blade carrying member is uniquely constructed to shield the rollers and rolling surface from the deposit of dirt and debris to prolong the life of the conveyor belt cleaner. The conveyor belt cleaner is rugged in construction, long wearing and resists jamming.

The mounting means is preferably a jack screw and spring combination which are shielded by an enclosure. The enclosure shields the threads of the jack screw from foreign matter and guards the spring.

The jack screw is pivotably connected to the support member and/or blade carrying member so that both ends may be lowered to permit rolling the blade carrying member onto and off of the support member. The pivotable connecton also permits the conveyor belt cleaner to be secured to the conveyor at an angle.

According to another feature of the present invention, the rotatable means comprise cylindrically shaped rollers rotatably journaled on the blade carrying member.

According to another feature of the present invention, the blade carrying member substantially encloses the support member to prevent the deposit of dirt on the support member while the blade carrying member is in its operative position.

Other features and advantages of the invention will become apparent upon reading the following detailed description with reference to the drawings.

BRIEF DESCRIPTION OF THE DRAWINGS

FIG. 2 is an end view of the conveyor belt cleaner of the present invention shown assembled to the conveyor.

FIG. 3 is a plan view of the conveyor belt cleaner shown assembled to the conveyor.

FIG. 4 is a fragmentary cross-section side view of the access doors and the side of the conveyor taken along the line 4—4 in FIG. 1.

FIG. 5 is a fragmentary cross-sectional view of the pivotable connection between the jack screw mounting means, the blade carrying member and the support member.

FIG. 6 is an end view showing the conveyor belt cleaner with the blade carrying member partially removed from the support member and being tipped down on one end.

FIG. 7 is a fragmentary cross-sectional view of the jack screw and spring assembly taken along the line 7—7 in FIG. 1.

DETAILED DESCRIPTION

Figure 1:
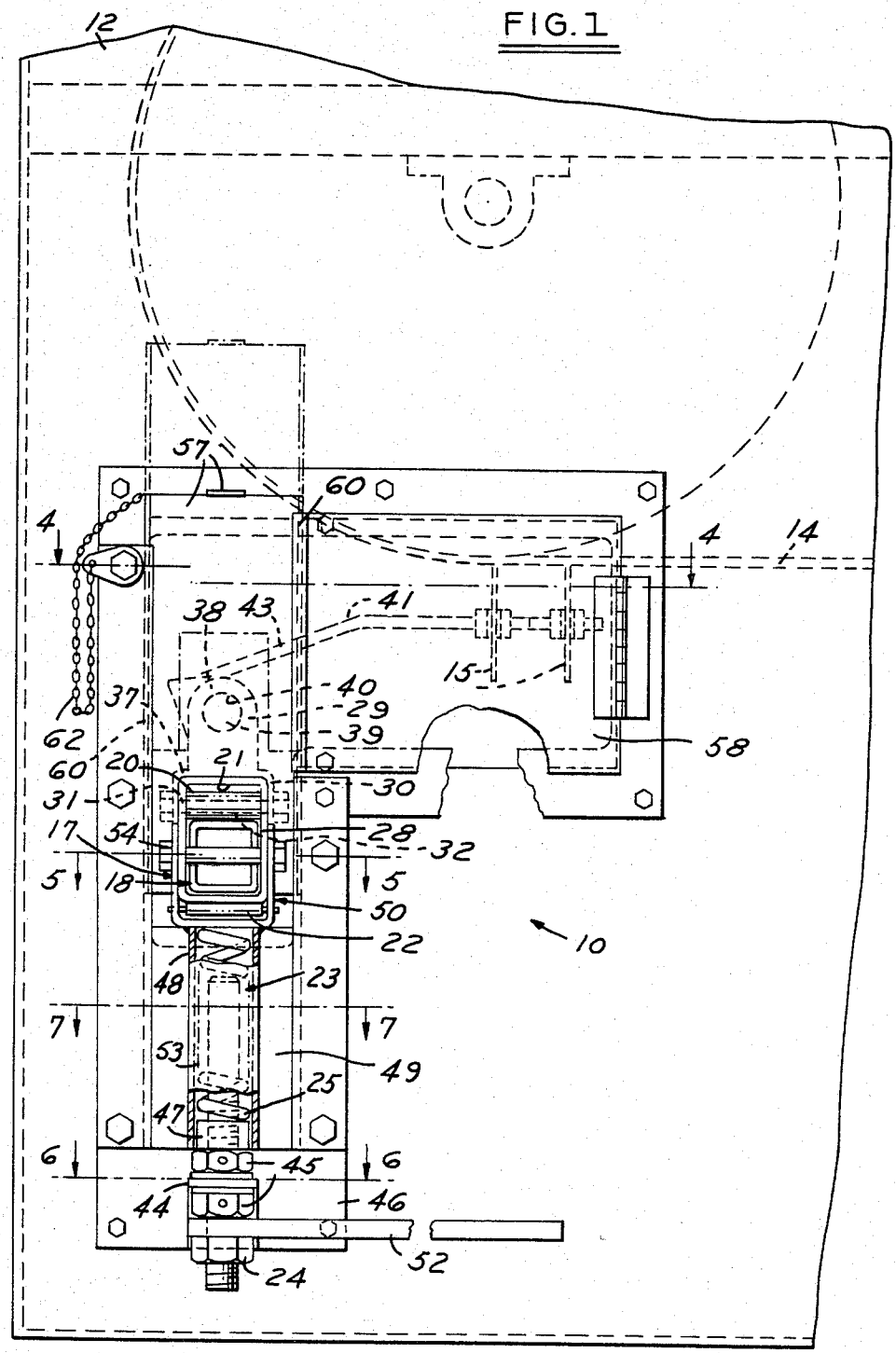
FIG. 1 is a side view of the conveyor belt cleaner of the present invention having spring arm mounted blades and being shown assembled to the conveyor in its operative position.

Referring now to the drawings, a conveyor belt cleaner, generally designated by the numeral 10, is attached to a conveyor 12 to clean the surface of an endless belt 14. One or more blades 15 are provided on the cleaner 10 to scrape the surface of the endless belt 14 as it moves past the cleaner 10. Each blade 15 is retained on a blade carrying member, generally indicated by the numeral 17, which is in turn retained on a support member 18 when in its operative position on the conveyor 12. The support member 18 extends transverse to the direction of travel of the endless belt 14. A plurality of rollers 20 are provided between the blade carrying member 17 and the support member 18 within a clearance space 21 bounded by opposing surfaces of the blade carrying member 17 and the support member 18. The conveyor belt cleaner 10 can be easily serviced by rolling the blade carrying member 17 along the support member 18 to a position wherein the blade 15 is not beneath the endless belt 14.

An adjustable mounting means, generally indicated by the reference numeral 23 is provided for holding opposite ends of the support member 18 on opposite sides of the conveyor 12. The adjustable mounting means includes a jack screw 24 and a spring 25 assembled together on opposite ends. The jack screw 24 is used to move an end of the support member 18 closer to or away from the endless belt 14 to adjust or service the conveyor belt cleaner 10.

The blade carrying member 17 comprises a rectangular tubular member 28 substantially enclosing and extending across the length of the support member 18. The rectangular tube 28 may be segmented, if desired, to permit removal of the blade carrying member 17 in confined areas. In situations where there is insufficient space beside a conveyor 12 to permit the entire blade carrying member 17 to be rolled off in one piece, the blade carrying member 17 may be split into two or more segments and removed one segment at a time.

The blade carrying member shown in FIGS. 1 through 7 discloses the use of a spring arm support 29. The spring arm support 29 includes ears 30 on opposite sides of the rectangular tube 28. A hole 31 is formed through the ears 30 and rectangular tube 28 through which a shaft 32 extends. On opposite ends of the rectangular tube 28, or segments of the rectangular tube 28, rollers 20 are disposed on shafts 32. Each shaft 32 is attached to the spring arm support 29 with their central axis transverse to the longitudinal axis of the support member 18. The rollers 20 are thereby adapted to roll along the top surface of the support member 18 in a direction parallel to the longitudinal axis of the support member 18. Each spring arm support 29 also includes a base portion 37 secured to the top of the rectangular tube 28 with perpendicular tab portions 38 extending from opposite sides of the base portion 37. The tab portions 38 each include a hole 40 for receiving a machine screw and nut assembly 39 which is used to retain the spring arm assembly 41 on the spring arm support 29.

The spring arm assembly 41 includes a helical spring portion 42 through which the machine screw and nut assembly 39 extends and a rod portion 43 extending from the helical spring portion 42 to which the blade 15 is secured by suitable fasteners.

The adjustable mounting means 23 is provided on opposite sides of the conveyor to support the opposite sides of the support member 18 and blade carrying member 17. The adjustable mounting means 23 includes a threaded shaft 53 which is received within a block 44 that is in turn welded to a mounting plate 46 which is bolted to the conveyor 12. The block 44 in the disclosed embodiment includes a pair of nuts 45 on opposite sides thereof which adjustably receives the threaded shaft 53 on the block 44.

A square nut 47 is provided on the threaded shaft 53 and is received within a tubular sleeve 48. The tubular sleeve 48 is adapted to slide over the square nut 47. The tubular sleeve 48 is attached to the guide plate 49 which is slidably mounted within a pair of guide channels 60 for maintaining the alignment of the sleeve 48. The top end of the tubular sleeve 48 is secured to a U-shaped yoke 50 which is adapted to be secured to the blade carrying member 17 and/or the support member 18. The spring 25 is engaged on its opposite ends by the square nut 47 and the yoke 50 to resiliently hold the blade carrying member 17 and support member 18 on the conveyor 12. The end of the threaded shaft 53 is spaced from the yoke 50 so that the spring 25 may be compressed when the blade 15 is impacted by an object such as a mechanical splice on the belt. When the blade 15 is impacted the blade carrying member 17 and support member 18 are permitted to move downwardly because the tubular sleeve 48 can slide over the square nut 47 to absorb the shock. The spring 25 biases the blade into contact with the belt but does so resiliently to save wear and tear on the conveyor belt cleaner 10.

A ratchet assembly 52 is provided to adjust the theaded shaft 53 upwardly to increase the pressure exerted on the conveyor belt or downwardly to reduce the pressure. The ratchet 52 is also used to move the end of the blade carrying member 17 away from the belt to permit the removal of the blade carrying member 17 from the support member 18 for servicing. An end roller 22 may be positioned on the mounting means 23 to further facilitate rolling the blade carrying member 17 onto and off of the support member 18. The blade carrying member 17 and support member 18 are attached to the yoke 50 by means of a fastener 54 which extends through an opening formed through both tabs of the yoke 50, the blade carrying member 17 and/or the support member 18. The fastener 54 is removed to permit the blade carrying member 17 to be rolled off the support member 18 for servicing. When servicing is complete the blade carrying member 17 may be rolled back on the support member 18 and the fastener replaced to hold the blade carrying member 17 in place.

The conveyor includes access doors on the side through which the blade carrying member 17 is to be moved. In the embodiment disclosed in FIGS. 1 through 7 a slide door 57 and hinged door 58 are provided as access doors. The slide door 57 is adapted to be pulled up and out of the way so that the blade carrying member 17 may be rolled off of the support member 18 and the hinged door 68 provides clearance for removing the blades 15 and spring arm 41 from the conveyor 12. As best shown in FIG. 4, the slide door 57 is moved within a pair of guide channels 60, one of which is formed as the end of the hinged door 58. The slide door 57 is preferably retained on the conveyor 12 by means of the guard chain 62 as is well known in the art. The access doors 57 and 58 may be provided on either or both sides of the conveyor 11 if it is desirable to be able to examine the conveyor belt cleaner from either side of the conveyor 12.

The blade carrying member 17 may be formed in a plurality of segments 65 if insufficient space is available to permit the entire blade carrying member 17 to be removed in one piece from the conveyor 12. Although it is preferred to use a single piece blade carrying member 17, if the blade carrying member must be broken into segments 65 the shielding function of the blade carrying member may be aided by the use of channel shaped linking members 66. The linking members 66 are welded to one segment and may be connected to an abutting segment by fasteners 67. Fasteners 67 are then removed from the segment 65 as they are pulled off the support member 18. One advantage of the segmented arrangement is that a segment 65 of the blade carrying member 17 may be replaced as a unit if it becomes damaged. It is important that the linking member 66 substantially covers the space between the abutting segments so that dirt and debris are not permitted to fall from the conveyor belt 14 to the support member 18.

Rubber sealing rings 70 may also be used according to the present invention to provide an additional shield between the adjacent segments 65. The rubber sealing rings 70 may include means on opposite sides for gripping the edges of adjacent segments 65.

Figure 8:
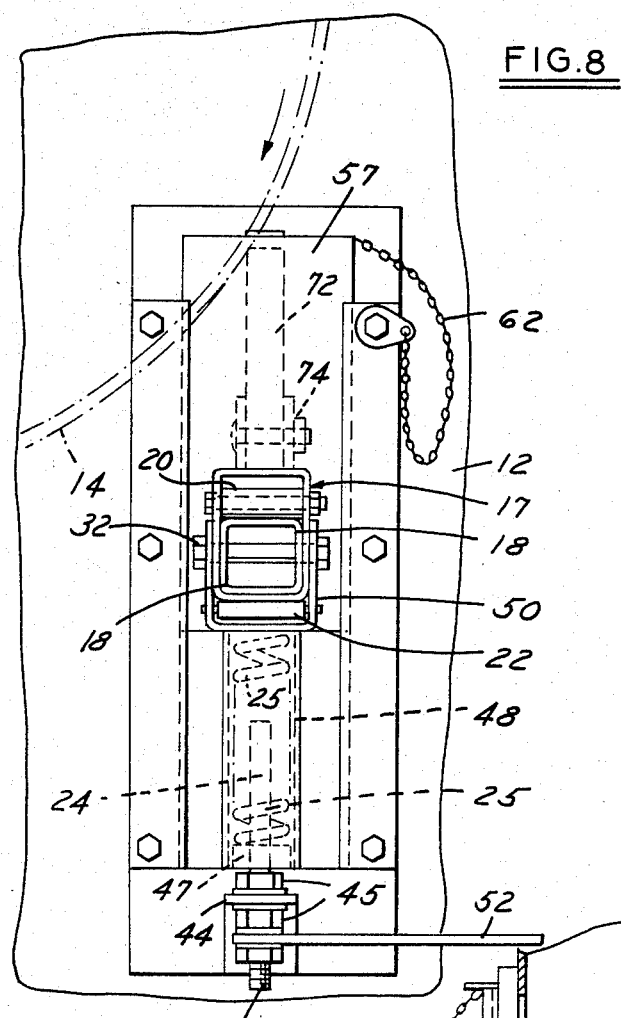
FIG. 8 is a side view of the conveyor belt cleaner with a doctor blade scraper.
Figure 9:
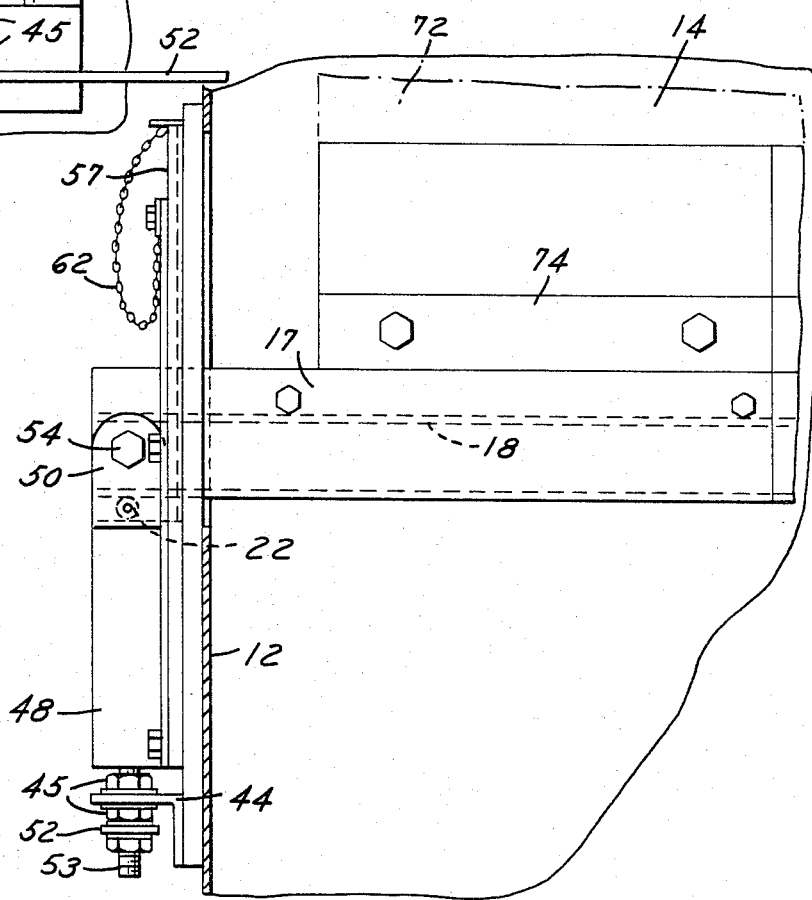
FIG. 9 is a fragmentary end view of the conveyor belt cleaner showing a portion of a doctor blade scraper.

In another embodiment of the present invention, as shown in FIGS. 8 and 9, a doctor blade 72 made from urethane or another suitable material, may be directly attached to the blade carrying member 17 by means of a blade clamp 74. The doctor blade 72 is adapted to scrape the conveyor belt 14 without an intervening spring arm assembly 71. The blade clamp 74 locks the doctor blade 72 in place on the blade carrying member 17. In this embodiment, a single access door, preferably the slide door 57, is provided on the conveyor 12 for permitting the blade carrying member 17 to be rolled off of the support member 18 and through the side of the conveyor 12.

As with the spring arm embodiment, shown in FIGS. 1-7, the blade carrying member 17 may be segmented to permit servicing and installation of the apparatus in confined areas.

In the doctor blade embodiment, the adjustable mounting means 23 provides the primary means for absorbing shocks and impacts from the belt upon the conveyor belt cleaner 10. This is true because in this embodiment there is no spring arm assembly 41 between the blade 15 and the blade carrying member 17.

OPERATION

Operation of the present invention will be described with reference to the doctor blade embodiment of the present invention, but it is to be understood that the embodiment having the spring arm mounted blade 15 operates in substantially the same manner as the doctor blade embodiment. In operation, the doctor blade 72 is retained by the blade clamp 74 on the blade carrying member 17 to exert pressure on the endless belt 14. Pressure is applied by turning the ratchet 52 to move the square nut 47 along the threaded shaft 53. The spring 25 biases the blade 72, blade carrying member 17 and support member 18 toward the endless belt 14.

When a mechanical splice or other object on the belt 14 contacts the blade 72, the blade 72 is formed away from the endless belt 14. When this happens, the tubular sleeve 48 is permitted to telescope over the square nut 47 to the extent that the resiliency of the spring 25 is overcome. The spring 25 then urges the blade 72 back into engagement with the endless belt 14 after the mechanical splice has passed by the blade 72.

In the normal course of usage, the blade 72 will wear as a result of the endless belt abrading the edge of the blade 72. The spring 25 biases the blade into contact with the endless belt 14 thereby providing an automatic adjustment for wear. However, periodically the adjustable mounting means 23 is used to compensate for blade wear by moving the blade toward the endless belt 14. The adjustable mounting means 23 is adjusted by turning the ratchet 52 until the desired pressure is exerted on the belt 14.

The access door 57 provides a convenient way of periodically inspecting the conveyor belt cleaner 10 to determine if the blade is still working properly of if it requires adjustment. The conveyor belt cleaner may be serviced by simply turning the ratchet 52 to pull the blade away from the belt 15. The access door 57 opens providing access to the blade carrying member 17 for removing it from the conveyor 12. The fastener 54 is then removed from the yoke 50, the support member 18 and the blade carrying member 17. When the blade 72 is substantially clear from the belt 14, the support member 18 and blade carrying member 17 may then be lifted as a unit from the yoke 50 so that the blade carrying member 17 may be rolled off of the support member 18.

It will be readily appreciated that the entire servicing procedure can be safely performed without stopping the conveyor. After removal, the blade carrying member 17 may be serviced or replaced with an equivalent blade carrying member 17. To reinstall the blade carrying member 17 the above steps are reversed and the blade 72 is tightened against the belt 14 by turning the rachet 52.

If a segmented blade carrying member is used, the same procedure is followed except that each segment 65 is removed in turn by first removing the fastener 67 from the blade carrying member to permit the segment 65 to be lifted off of the linking member 66.

It should be readily appreciated that the blade carrying member is easy to remove from the support member 18 because the movement is aided by the rollers 20 located in the clearance space 21. The blade carrying member 17 is pivotably retained on the yoke 50 at its access door end by the fastener 54 so that the blade carrying member 17 may be lifted from the yoke permitting it to be rolled off of the support member 18. The opposite end of the support member 18 from the access door, which is not shown in FIGS. 8 and 9 but may be understood with reference to FIG. 6, is retained within the yoke 50 by a fastener 54 but the blade carrying member 17 is not attached on said opposite end to permit removal from the access door side.

Free movement of the rollers 20 along the support member 18 is assured because the support member 18 is shielded from the deposit of dirt and debris on the blade carrying member 17.

The above description is provided as an example of two embodiments of the invention and should not be construed to limit the invention. The present invention should be construed in accordance with the following claims.

I claim:

1. A conveyor belt cleaner for use on a conveyor having an endless belt comprising:
   an elongate support member having a first longitudinal axis adapted to extend transversely of the endless belt;
   a blade carrying member having a blade affixed thereto and being carried by said support member and having a second longitudinal axis spaced from and parallel to said first longitudinal axis;
   said blade carrying member including one or more blades adapted to scrape the endless conveyor belt;
   rotatable means interposed between said support member and said blade carrying member for rolling the blade carrying member along the support member, said rotatable means being mounted for rotation on one of said members and in rolling contact with the other of said members; and
   first and second mounting means interconnecting the elongate support and the conveyor at spaced locations for adjustably biasing said blade carrying member toward the endless belt.

2. The conveyor belt cleaner of claim 1 wherein said first and second mounting means each include:
   a jack screw attached to the conveyor and having a threaded member received thereon for movement relative to the endless belt; and
   a spring supported on the threaded member and disposed between the threaded member and the support member;
   whereby the position of the support member may be adjusted by the jack screw.

3. The conveyor belt cleaner of claim 2 wherein said jack screws and springs are each partially enclosed by a tubular sleeve secured to the support member for movement therewith relative to the conveyor.

4. The conveyor belt cleaner of claim 3 wherein a yoke is attached to each tubular sleeve said yoke being adapted to be removably and pivotably secured to the support member.

5. The conveyor belt cleaner of claim 1 wherein said first and second mounting means are each pivotably attached to the elongate support member by a cylindrical member having a central axis parallel to the endless belt.

6. The conveyor belt cleaner of claim 5 wherein the cylindrical member of said first and second mounting means is removable to permit removal of the blade carrying member from said support member.

7. The conveyor belt cleaner of claim 6 wherein said rotatable means comprises a plurality of cylindrically shaped rollers having a cylindrical axis perpendicular to said first and second longitudinal axes.

8. The conveyor belt cleaner of claim 7 wherein said support member is adapted at one end to be secured to one of said mounting means.

9. The conveyor belt cleaner of claim 8 wherein said support member comprises a first tubular member having an upper surface, said support member at one end being adapted to be secured to a support; arm means attached to the blade carrying member for securing each of said blades to said blade carrying member, a second tubular member telescopically received on said first tubular member and together defining a clearance space therebetween, said rollers being disposed in the clearance space to permit the blade carrying member to be rolled onto and off of the support member for servicing the conveyor belt cleaner.

10. The conveyor belt cleaner of claim 9 wherein said blade carrying member comprises a plurality of segments assembled onto the support member in end to end abutting relationship, said segments each having a plurality of rollers with each roller being journalled on a shaft and disposed within the clearance space, said shafts being aligned parallel to one another to permit the rollers to facilitate rolling of the segments along the support member.

11. The conveyor belt cleaner of claim 9 wherein said blades are secured to a spring arm attached to the blade carrying member.

12. The conveyor belt cleaner of claim 9 wherein said blade is an elongate unitary and substantially rigid elastomeric member.

13. The conveyor belt cleaner of claim 10 wherein said segments are detachably secured together at each abutting end by a linking member.

14. The conveyor belt cleaner of claim 13 wherein sealing rings are provided between said segments.

* * * * *